(12) United States Patent
Wang

(10) Patent No.: US 8,074,337 B2
(45) Date of Patent: Dec. 13, 2011

(54) METAL PLATE MEMBER FIXATION DEVICE INSTALLATION METHOD

(76) Inventor: Kuo-Chung Wang, Yunlin County (TW)

( * ) Notice: Subject to any disclaimer, the term of this patent is extended or adjusted under 35 U.S.C. 154(b) by 300 days.

(21) Appl. No.: 12/566,335

(22) Filed: Sep. 24, 2009

(65) Prior Publication Data

US 2011/0067219 A1 Mar. 24, 2011

(51) Int. Cl.
*B23P 11/00* (2006.01)
*F16B 39/00* (2006.01)

(52) U.S. Cl. ............... 29/525.01; 29/525.02; 29/525.11; 29/525.14; 411/352; 411/999; 411/171

(58) Field of Classification Search ............... 29/525.01, 29/525.02, 525.1, 525.14; 411/352, 171, 411/999
See application file for complete search history.

(56) References Cited

U.S. PATENT DOCUMENTS

| | | | |
|---|---|---|---|
| 4,387,497 A * | 6/1983 | Gulistan | 29/511 |
| 6,309,158 B1 * | 10/2001 | Bellinghausen et al. | 411/353 |
| 6,468,012 B2 * | 10/2002 | Ellis et al. | 411/353 |
| 6,761,521 B2 * | 7/2004 | McCormack et al. | 411/353 |
| 6,814,530 B2 * | 11/2004 | Franco et al. | 411/353 |
| 7,083,371 B2 * | 8/2006 | McAfee | 411/107 |
| 7,197,806 B2 * | 4/2007 | Boudreaux et al. | 29/434 |
| 7,213,321 B2 * | 5/2007 | Franco et al. | 29/453 |
| 7,237,333 B2 * | 7/2007 | McAfee | 29/843 |
| 7,905,696 B2 * | 3/2011 | Chiu | 411/353 |
| 7,938,607 B2 * | 5/2011 | Wang | 411/107 |
| 2002/0172574 A1 * | 11/2002 | McCormack et al. | 411/352 |
| 2004/0131444 A1 * | 7/2004 | Franco et al. | 411/352 |

* cited by examiner

*Primary Examiner* — Jermie Cozart
(74) *Attorney, Agent, or Firm* — Muncy, Geissler, Olds & Lowe, PLLC

(57) ABSTRACT

A metal plate member fixation device installation method includes the step of preparing a barrel, the step of bonding the barrel to one of two metal plate members to be affixed by a reflow soldering process, the step of providing a screw member and a cap and coupling the screw member and the cap tightly together, the step of preparing a spring member and sleeving the spring member onto the shank of the screw member and then inserting the screw member and the spring member into the barrel at the metal plate member, the step of axially slidably coupling the cap to the barrel to let the spring member be stopped between a step in the barrel and a part of the shoulder of the screw member, and the step of releasing the pressure from the cap to finish the installation.

8 Claims, 9 Drawing Sheets

METAL PLATE MEMBER FIXATION DEVICE INSTALLATION METHOD

BACKGROUND OF THE INVENTION

1. Field of the Invention

The present invention relates to the application of a metal plate member fixation device for joining two metal plate members and more particularly, to a metal plate member fixation device installation method, which facilitates mounting and dismounting of a metal plate member fixation device, avoiding damage to the structural strength or change of physical properties of the screw member, cap and spring member of the metal plate member fixation device and assuring high durability of the metal plate member fixation device.

2. Description of the Related Art

When fastening plate members together, a positioning screw formed of a knob, a ring and a screw nail is usually used. During installation, the screw nail and the ring are secured to the first plate member, and then the knob is rotated to drive the screw nail into the second plate member, and then a hand tool is used to fasten tight the screw nail, affixing the first and second plate members together. This plate member joining method can be used in a machine tool to join plate members together. The power drive and speed-adjustment unit of a machine tool are generally provided inside the housing. To facilitate repair of a machine tool or adjustment of the output speed of a machine tool, a detachable plate member is usually provided at the housing of the power drive or speed-adjustment unit. Screw bolts are commonly used to fasten the movable plate member to the housing. When unfastening screw bolts to dismount a movable plate member from the housing, the associating lock nuts may fall from the screw bolts. This movable plate member mounting and dismounting procedure is complicated, wasting much time and labor.

There is known a metal plate member fixation device comprised of a cap, a screw bolt, a spring member and a locating base for joining two metal plate members together. After fixation of the locating base of the metal plate member fixation device to a through hole on a first plate member, the screw bolt is threaded into a screw hole on a second plate member to secure the first plate member and the second plate member together. Because the locating base of the metal plate member fixation device is kept secured to the first plate member after removal of the first plate member from the second plate member, the metal plate member fixation device will not be missed by accident. According to this design, the cap is a metal member. After the screw bolt is accommodated in the cap, a machine tool is used to process the cap so that retaining protrusions are formed on the cap and forced into engagement with the screw bolt. This processing process requires high precision and wastes time and labor. During processing, the cap may be compressed excessively, resulting in permanent deformation. Further, the cap may be directly molded from an anti-corrosion plastic material in any of a variety of colors on the head of the screw member by over-molding process, facilitating installation and eliminating a secondary processing process. Further, during installation of the metal plate member fixation device to affix two metal plate members together, the barrel is inserted into a mounting through hole on one metal plate member and then bonded thereto by means of a reflow soldering process. However, the plastic cap may be permanently deformed or the structural strength of the plastic cap may be weakened during the reflow soldering process. Further, the spring member will be tempered during the reflow soldering process, lowering its structural strength and shortening its service life.

Therefore, it is desirable to provide a metal plate member fixation device installation method that eliminates the aforesaid problems.

SUMMARY OF THE INVENTION

The present invention has been accomplished under the circumstances in view. It is therefore an object of the present invention to provide a metal plate member fixation device installation method, which facilitates mounting and dismounting of a metal plate member fixation device and assures high durability of the metal plate member fixation device.

To achieve this and other objects of the present invention, a metal plate member fixation device installation method comprises the steps of: preparing a barrel; bonding the barrel to one of two metal plate members to be affixed by a reflow soldering process; providing a screw member and a cap and coupling the screw member and the cap tightly together; preparing a spring member and sleeving the spring member onto the shank of the screw member and then inserting the screw member and the spring member into the barrel at the metal plate member; axially slidably coupling the cap to the barrel to let the spring member be stopped between a step in the barrel and a part of the shoulder of the screw member; and releasing the pressure from the cap to finish the installation. During installation of the barrel, the bottom bonding flange of the bottom mounting unit of the barrel is abutted to a solder material on the top surface of the metal plate member around the mounting through hole, and then a reflow soldering process is applied to bond the bottom bonding flange of the barrel to the metal plate member in a reflow oven.

Further, the barrel comprises a top coupling flange extending around the top end thereof remote from the bottom mounting unit. Further, the cap comprises an annular retaining portion inwardly raised from the free end of the bottom coupling flange and axially slidably coupled to the periphery of the barrel between the top coupling flange and the bottom mounting unit.

Further, the barrel can be made having a plurality of notches cut through the top coupling flange; the bottom coupling flange of the cap can be made having a plurality of coupling blocks that are respectively inserted through the notches of the barrel and coupled to the top coupling flange of the barrel after rotation of the cap relative to the barrel through an angle.

Further, the screw member comprises an operating portion protruded from the head thereof and a tool groove defined in the operating portion for enabling the screw member to be rotated by a hand tool. Further, the cap comprises an embossed grip formed integral with the periphery thereof, a tapered bottom coupling flange surrounding the center opening and gradually reducing in diameter in direction away from the embossed grip, and a plurality of longitudinal crevices equiangularly spaced around the tapered bottom coupling flange, facilitating coupling of the cap to the barrel. Further, the tool groove can be a Phillipes groove, keystone groove, asterisk groove or hex groove so that a corresponding screwdriver or wrench can be used to rotate the screw member with less effort.

DETAILED DESCRIPTION OF THE PREFERRED EMBODIMENT

Figure 1:
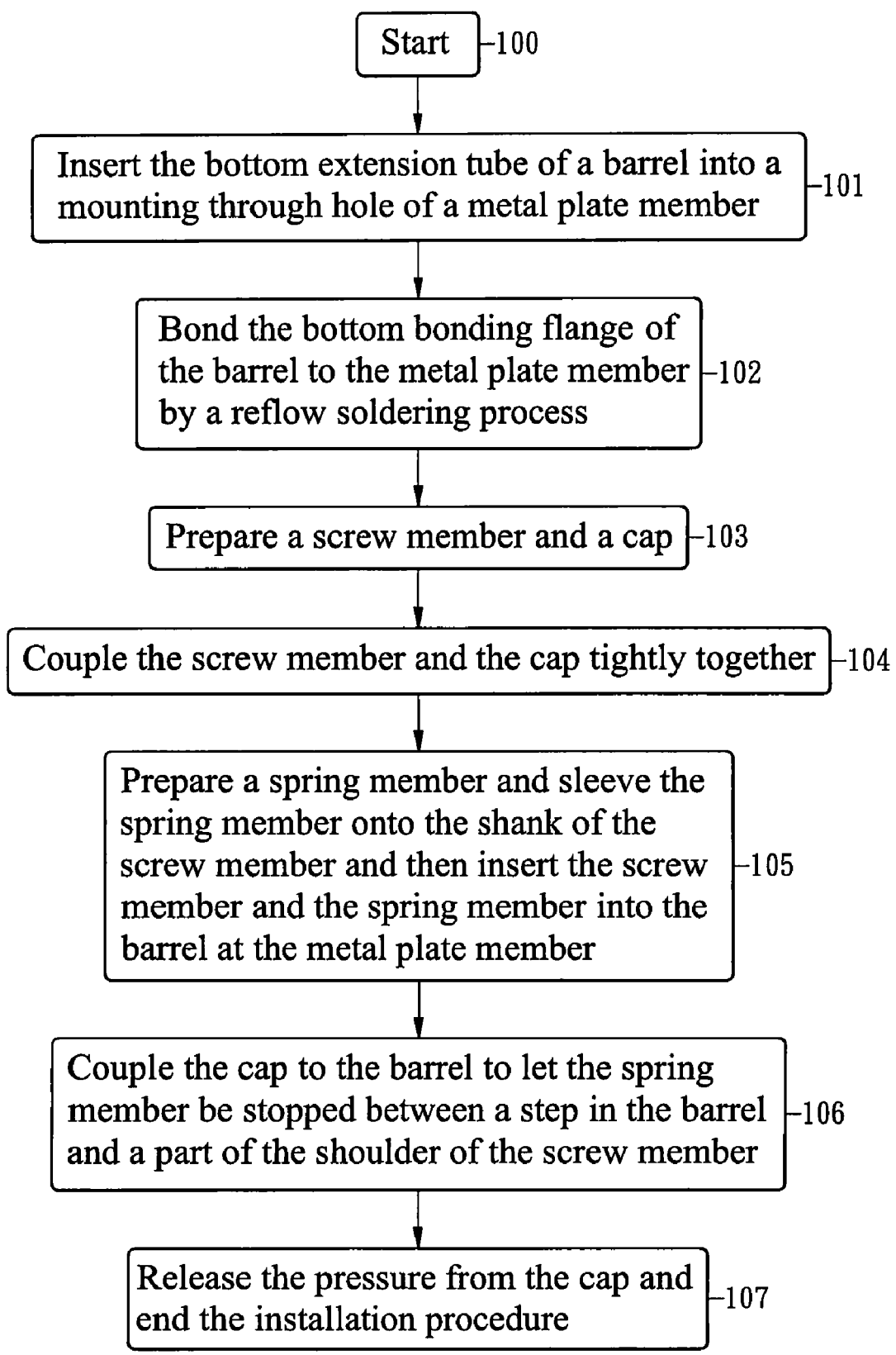
FIG. 1 is an elevational view of a metal plate member fixation device fixation method in accordance with the present invention.
Figure 2:
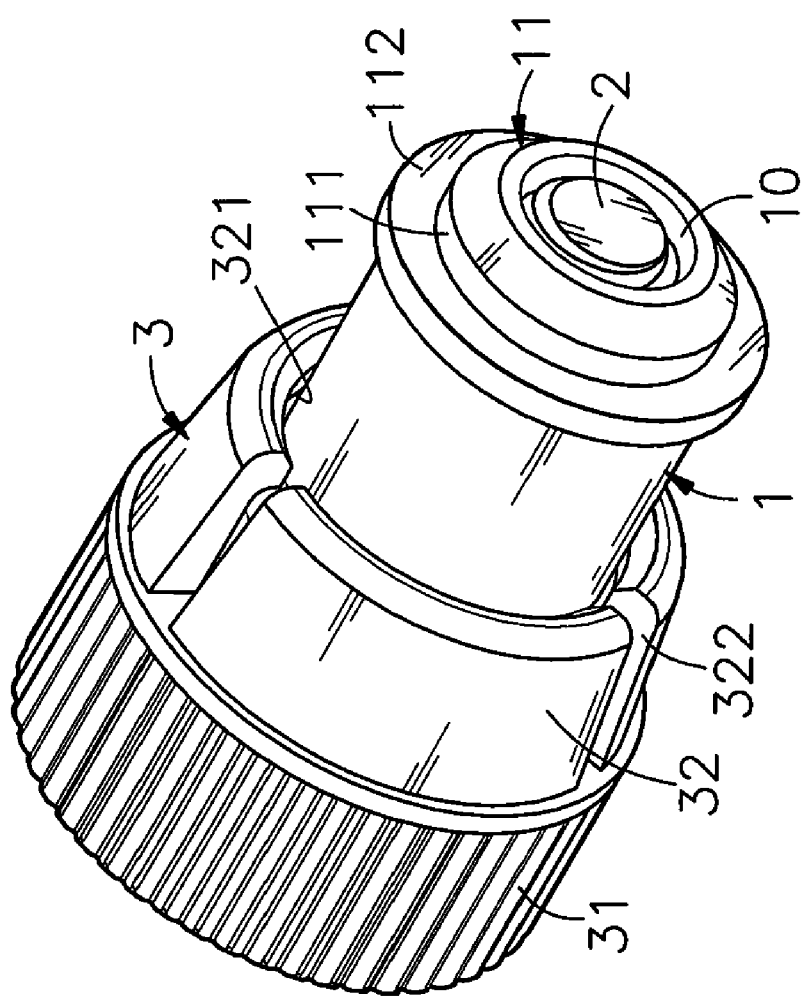
FIG. 2 is an elevational view of a metal plate member fixation device in accordance with the present invention.
Figure 3:
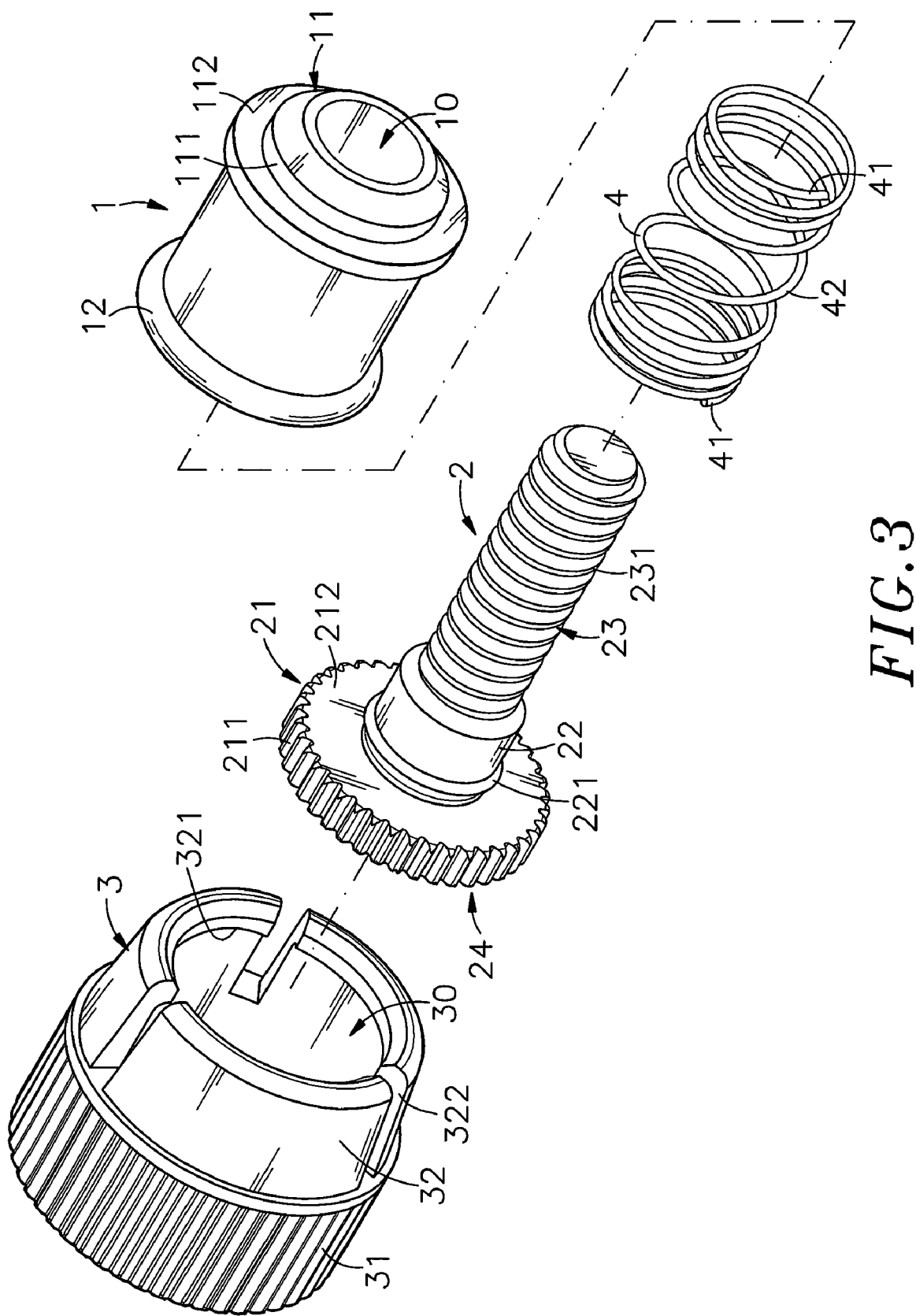
FIG. 3 is an exploded view of the metal plate member fixation device shown in FIG. 2.
Figure 4:
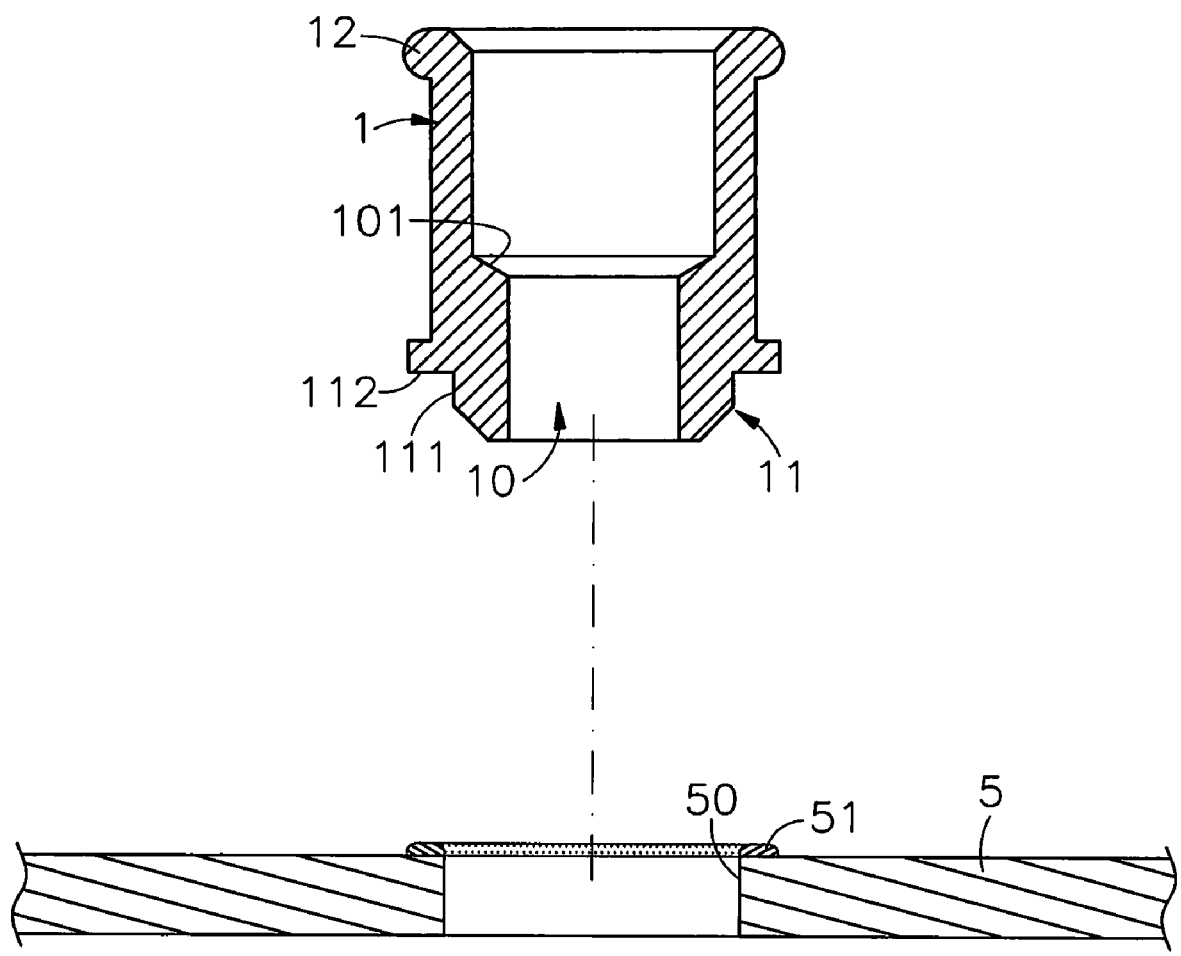
FIG. 4 is a schematic sectional view of the present invention, showing the barrel aimed at a mounting through hole of a first metal plate member before bonding.
Figure 5:
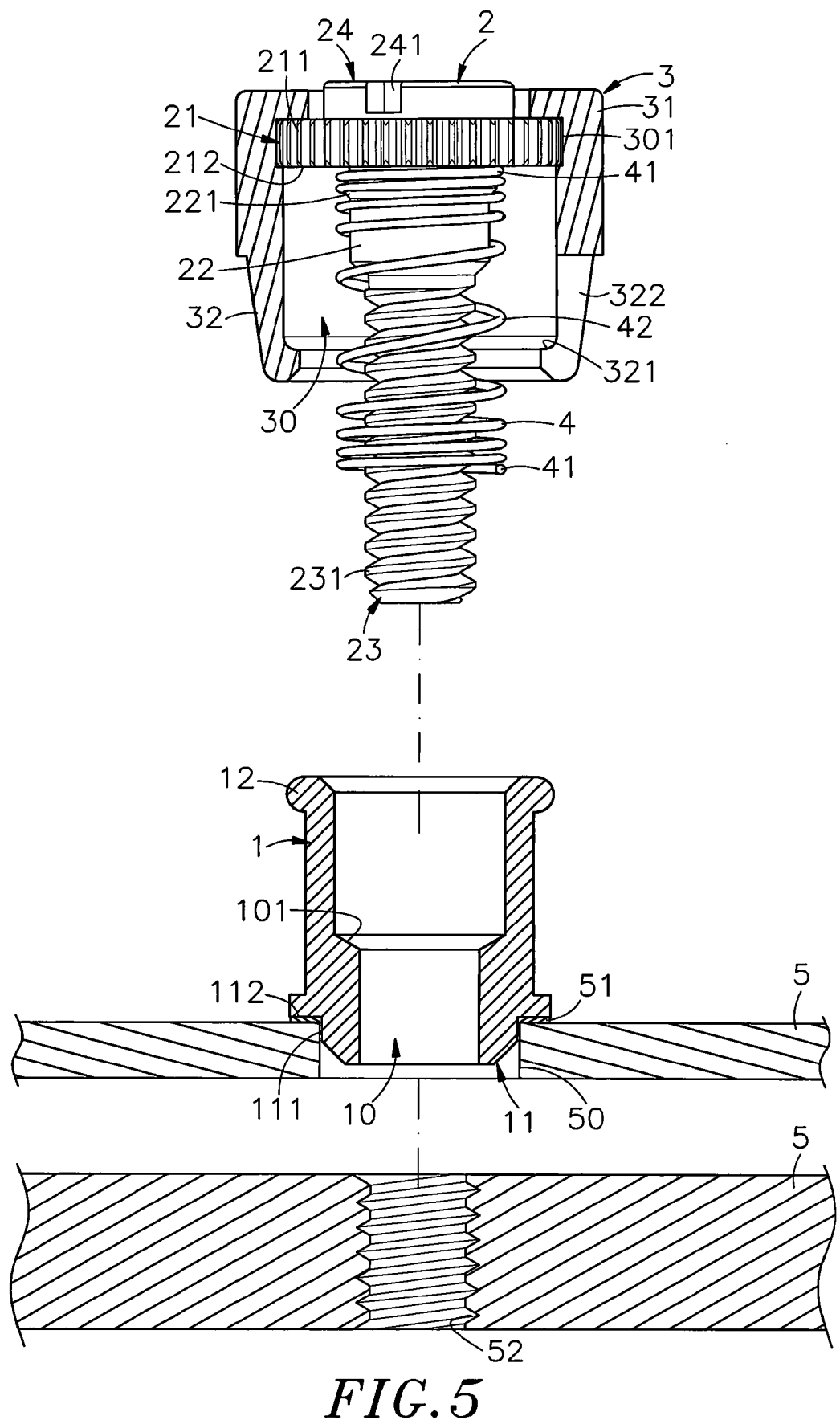
FIG. 5 is a schematic sectional view of the present invention, showing the barrel bonded to the first metal plate member and the screw member, the cap and the spring member assembled together.
Figure 6:
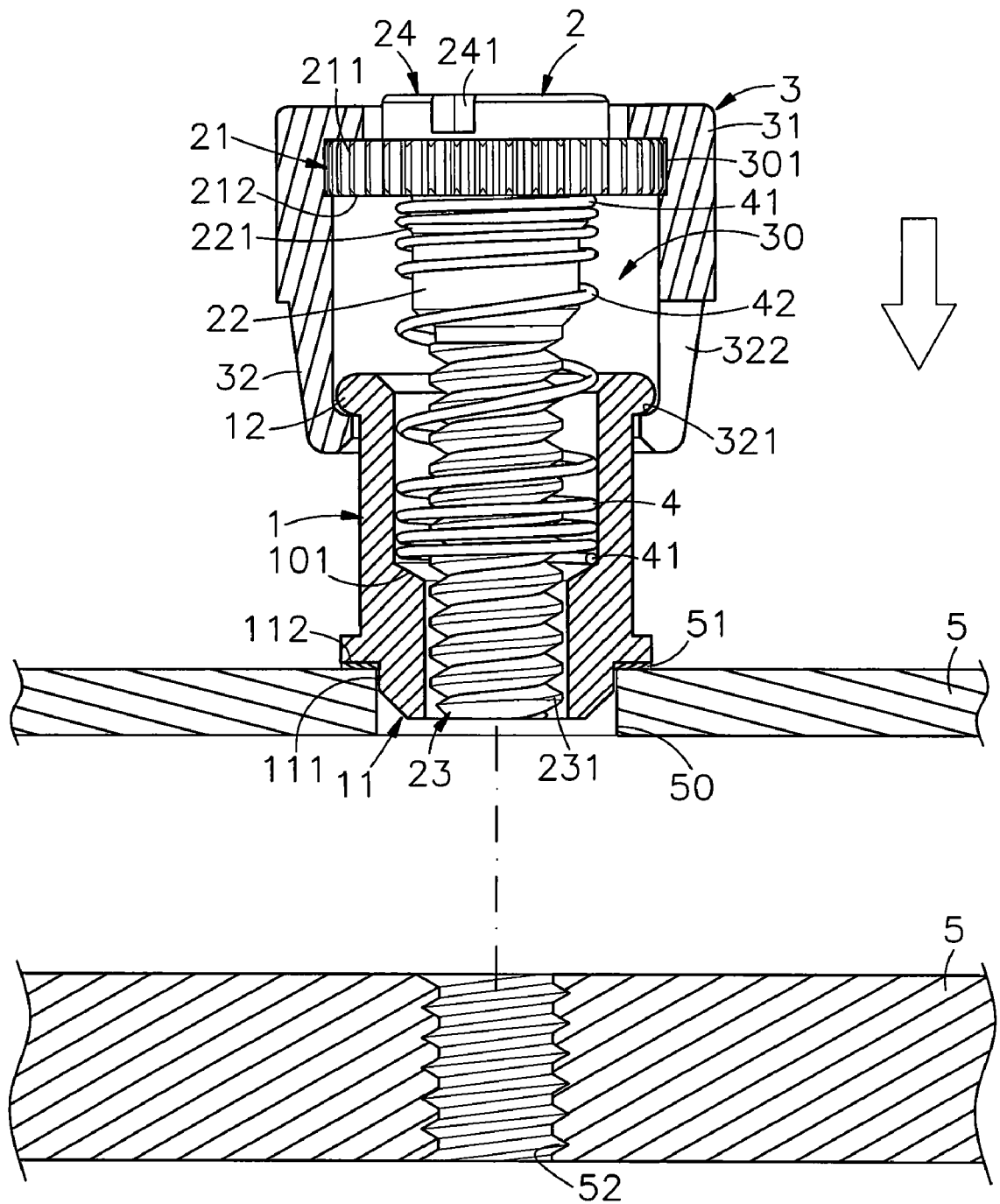
FIG. 6 corresponds to FIG. 5, showing the screw member inserted into the barrel and the cap coupled to the barrel.
Figure 7:
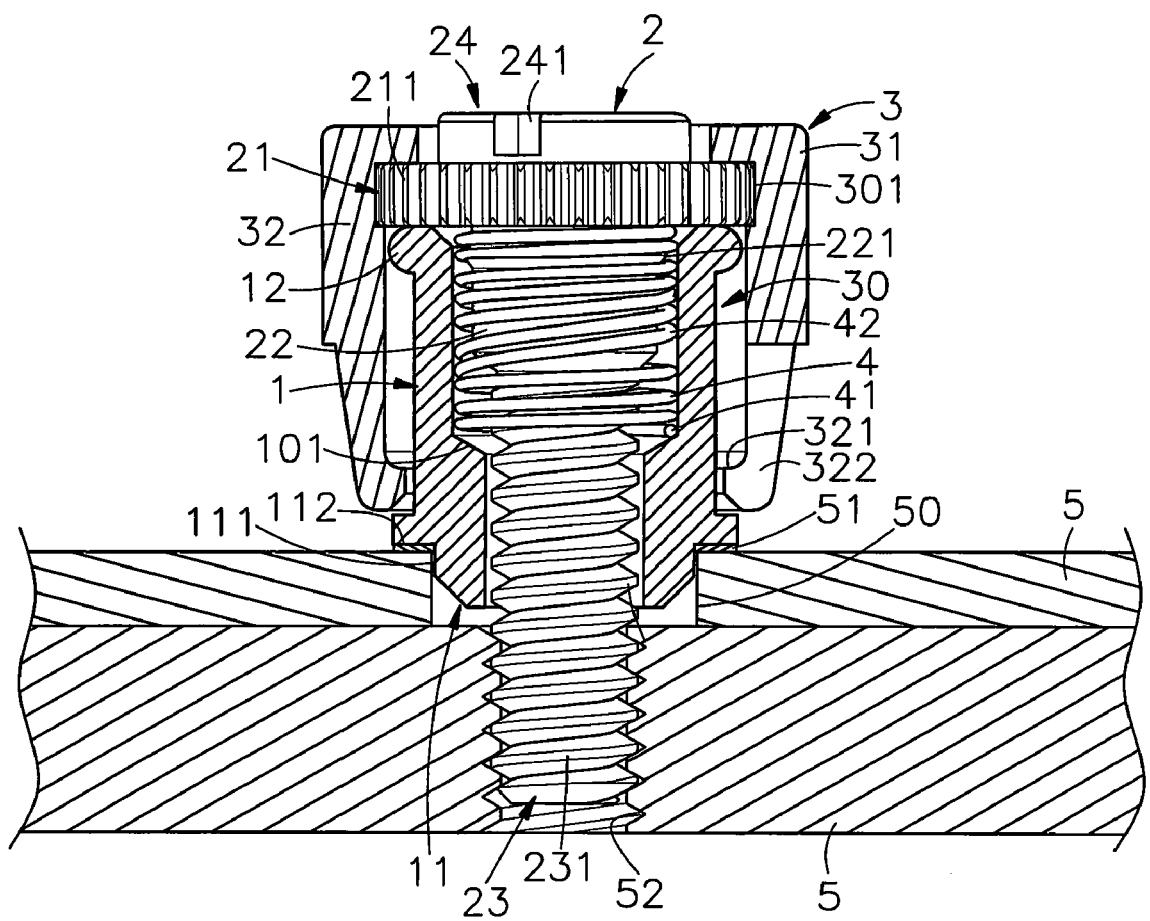
FIG. 7 corresponds to FIG. 6, showing the screw member threaded into the screw hole of the second metal plate member.

Referring to FIGS. 1~5, a metal plate member fixation device installation method in accordance with the present invention includes the following steps:

(100) Prepare a barrel 1 that comprises a top coupling flange 12, a bottom mounting unit 11 having a radially extended bottom bonding flange 112 and an axially extended bottom extension tube 111, a stepped axial hole 10 surrounded by the top coupling flange 12 and the bottom mounting unit 11 and a step 101 defined in the stepped axial hole 10, and then start the installation operation;

(101) Insert the bottom extension tube 111 of the bottom mounting unit 11 of the barrel 1 into a mounting through hole 50 of a first one of two metal plate members 5 to be affixed;

(102) Keep inserting the bottom extension tube 111 of the bottom mounting unit 11 of the barrel 1 into the mounting through hole 50 of the first one of the two metal plate members 5 to abut the bottom bonding flange 112 of the bottom mounting unit 11 of the barrel 1 to a solder material 51 on the top surface of the first one of the two metal plate members 5 around the mounting through hole 50, and then apply a reflow soldering process to bond the bottom bonding flange 112 of the barrel 1 to the first one of the two metal plate members 5 in a reflow oven;

(103) Provide a screw member 2 that comprises a head 21, a shank 23 perpendicularly extended from the center of the bottom wall 212 of the head 21, a thread 231 spirally extending around the periphery of the shank 23, a shoulder 22 connected between the bottom wall of the head 21 and the shank 23, a locating rib 221 extending around the periphery of the shoulder 22 and an operating portion 24 located on the top side of the head 21, and a cap 3 that comprises a center opening 30 axially extending through the top and bottom sides;

(104) Couple the screw member 2 and the cap 3 together to have the operating portion 24 of the screw member 2 protrude out of the center opening 30 over the top side of the cap 3;

(105) Prepare a spring member 4 and sleeve the spring member 4 onto the shank 23 of the screw member 2, and then insert the screw member 2 and the spring member 4 into the stepped axial hole 10 of the barrel 1 at the first one of the two metal plate members 5;

(106) Couple the cap 3 to the barrel 1 to let the spring member 4 be stopped between the step 101 in the stepped axial hole 10 of the barrel 1 and the locating rib 221 of the screw member 2;

(107) Release the pressure from the cap 3 for enabling the spring member 4 to push the screw member 2 in direction away from the barrel 1 so that the cap 3 will be moved with the screw member 2 relative to the barrel 1 to have the bottom end of the cap 3 be stopped at the bottom side of the top coupling flange 12 of the barrel 1.

Thus, the metal plate member fixation device that is formed of the barrel 1, the screw member 2, the cap 3 and the spring member 4 is installed in the first one of the two metal plate members 5 to be affixed, and can be operated to detachably lock the first one of the two metal plate members 5 to the second one of the two metal plate members 5.

According to the present invention, the barrel 1, the screw member 2, the cap 3 and the spring member 4 are separately prepared and then assembled together. Before the assembly process, the barrel 1 is inserted into the mounting through hole 50 of the first one of the two metal plate members 5 and then bonded thereto by a reflow soldering process. During the reflow soldering process, it is not necessary to carry the screw member 2, the cap 3 and the spring member 4 into the reflow oven, avoiding damage to the structural strength or change of physical properties of the screw member 2, cap 3 and spring member 4 of the metal plate member fixation device and assuring high durability of the component parts of the metal plate member fixation device. After bonding of the barrel 1 to the first one of the two metal plate members 5, the screw member 2, the cap 3 and the spring member 4 can be assembled together and then coupled to the barrel 1 at the first one of the two metal plate members 5 conveniently without any further processing process. Thus, the installation of the metal plate member fixation device is quite simple, saving much time and labor.

Referring to FIGS. 6 and 7 and FIGS. 3~5 again, a metal plate member fixation device in accordance with the present invention comprises a barrel 1, a screw member 2, a cap 3, and a spring member 4.

The barrel 1 is a hollow cylindrical metal member comprising a top coupling flange 12, a bottom mounting unit 11 having a radially extended bottom bonding flange 112 and an axially extended bottom extension tube 111, a stepped axial hole 10 surrounded by the top coupling flange 12 and the bottom mounting unit 11 and a step 101 defined in the stepped axial hole 10.

The screw member 2 is a metal member comprising a head 21, an engagement portion 211 formed on the periphery of the head 21, a shank 23 perpendicularly extended from the center of the bottom wall 212 of the head 21, a thread 231 spirally extending around the periphery of the shank 23, a shoulder 22 connected between the bottom wall 212 of the head 21 and the shank 23, a locating rib 221 extending around the periphery of the shoulder 22 and an operating portion 24 located on the top side of the head 21 and carrying a tool groove 241.

The cap 3 is a hollow member comprising a center opening 30 axially extending through the top and bottom sides, an inside retaining groove 301 extending around the inside wall near the top side for retaining the engagement portion 211 of the screw member 2, an embossed grip 31 located on the periphery for gripping by hand, a bottom coupling flange 32 surrounding the center opening 30 and gradually reducing in diameter in direction away from the grip 31, a plurality of longitudinal crevices 322 equiangularly spaced around the bottom coupling flange 32, and an annular retaining portion 321 inwardly raised from the free end of the bottom coupling flange 32 and suspending in the center opening 30.

The spring member 4 has a coiled body 42 and two end portions 41 at the two distal ends of the coiled body 42.

By means of the bottom mounting unit 11, the barrel 1 is affixed to the mounting through hole 50 of the first one of the two metal plate members 5 to be locked by a reflow soldering process. After fixation of the barrel 1 to the first one of the two metal plate members 5 to be locked, the screw member 2 and the cap 3 are assembled together, and then the spring member 4 is sleeved onto the shank 23 of the screw member 2 and inserted with the screw member 2 into the stepped axial hole 10 of the barrel for enabling the two end portions 41 of the spring member 4 to be respectively stopped against the locating rib 221 of the screw member 2 and the step 101 defined in the stepped axial hole 10 of the barrel 1. Thereafter, the cap 3 is forced downwards to move the annular retaining portion 321 of the bottom coupling flange 32 over the top coupling flange 12 of the barrel 1. Thus, the cap 3 and the screw member 2 are axially slidably coupled to the barrel 1. Thereafter, force the cap 3 downwards to move the annular retaining portion 321 of the bottom coupling flange 32 downwardly along the periphery of the barrel 1 and simultaneously to force the shank 23 of the screw member 2 into the mounting through hole 50 of the first one of the two metal plate members 5 to be locked, and then rotate the cap 3 to drive the thread 231 of the screw member 2 into a screw hole 52 on the second one of the two metal plate members 5 to be locked, thereby locking the two metal plate members 5 together. Further, a hand tool can be attached to the tool groove 241 of the operating portion 24 and operated to drive the screw member 2 into the screw hole 52 on the second one of the two metal plate members 5 tightly.

Further, the aforesaid solder material 51 can be tin solder paste or tin solder balls for enabling the barrel 1 to be bonded to the first one of the two metal plate members 5 to be locked by a reflow soldering process.

Further, the tool groove 241 of the operating portion 24 and operated to drive the screw member 2 can be a Phillipes groove, keystone groove, asterisk groove or hex groove so that a corresponding screwdriver or wrench can be used to rotate the screw member 2 with less effort. Further, the embossed grip 31 of the cap 3 can have any of a variety of embossed patterns comprised of meshed lines, transverse lines and/or raised portions to enhance grip force. Further, the longitudinal crevices 322 of the cap 3 enables the bottom coupling flange 32 to be elastically expanded or compressed, facilitating mounting and dismounting operations.

Figure 8:
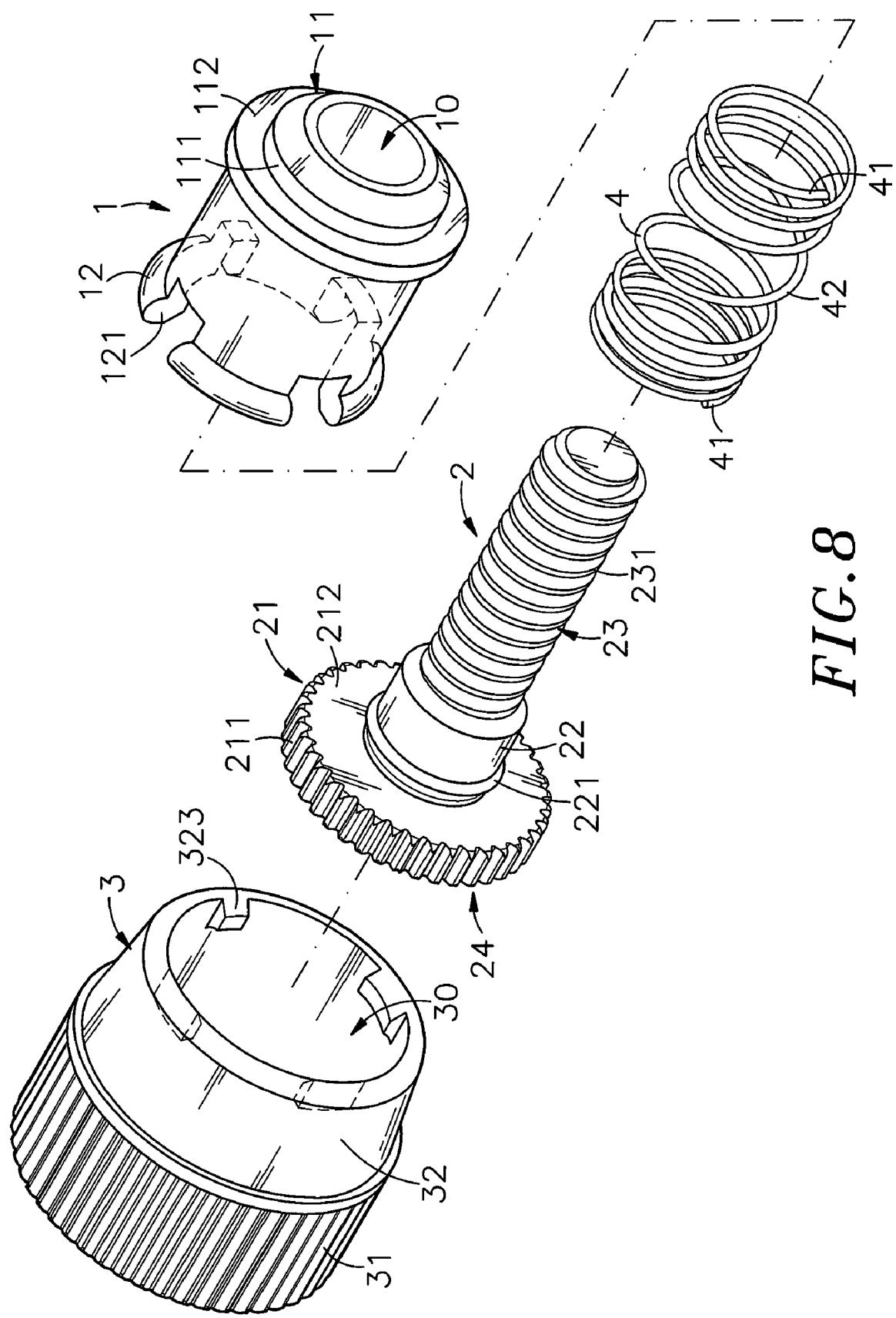
FIG. 8 is an exploded view of an alternate form of the metal plate member fixation device according to the present invention.
Figure 9:
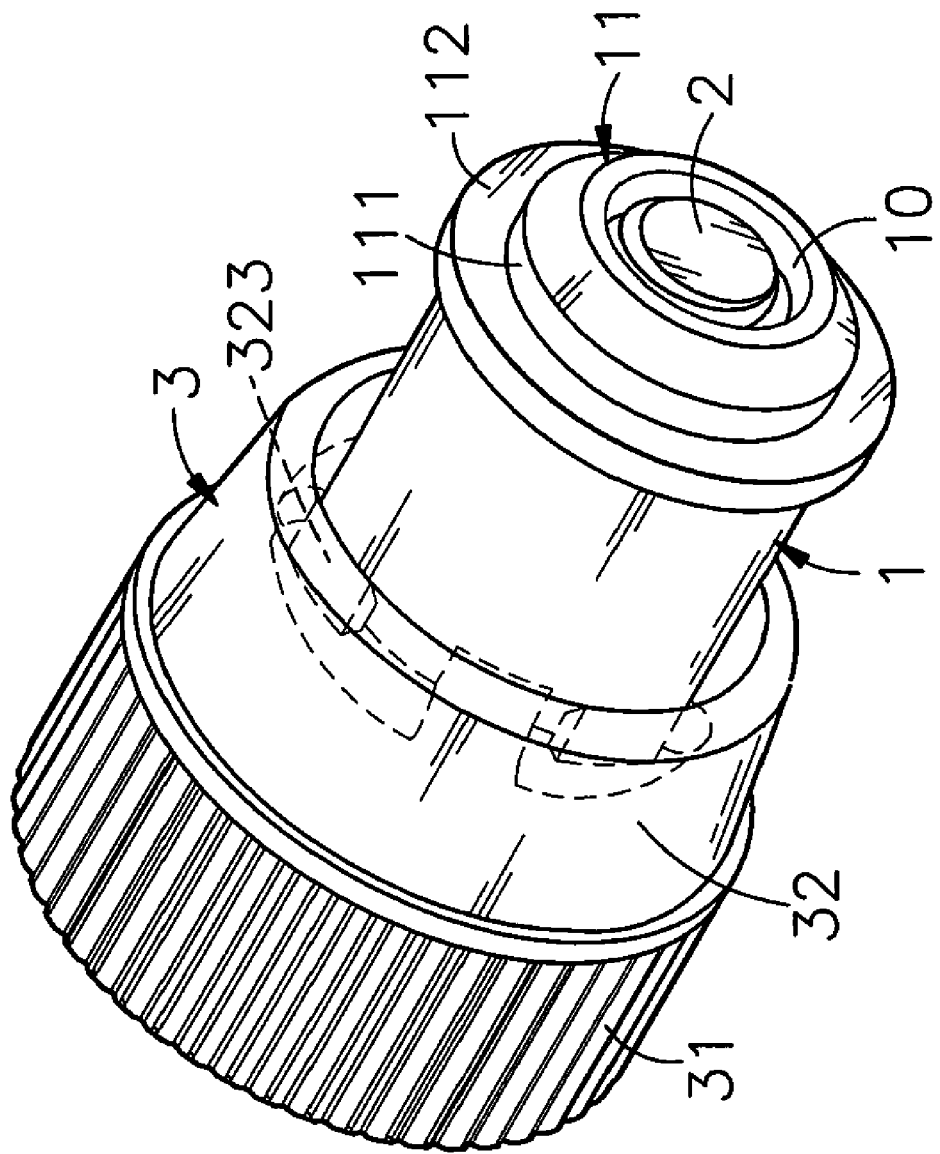
FIG. 9 is a perspective assembly view of the metal plate member fixation device shown in FIG. 8.

FIGS. 8 and 9 show an alternate form of the metal plate member fixation device. This alternate form is substantially similar to that shown in FIGS. 1~7 with the exception of the structure of the barrel 1 and the cap 3. According to this alternate form, the barrel 1 has a plurality of notches 121 cut through the top coupling flange 12 and equiangularly spaced from one another; the coupling flange 32 of the cap 3 is shaped like a tapered tube having a plurality of coupling blocks 323 inwardly protruded from the bottom edge of the free end of the coupling flange 32 corresponding to the notches 121 of the barrel 1. During installation, aim the coupling blocks 323 at the notches 121 and then cap the cap 3 onto the barrel 1 to insert the screw member 2 through the barrel 1 and to force the coupling blocks 323 through the notches 121, and then rotate the cap 3 through an angle relative to the barrel 1 to have the coupling blocks 323 be stopped at the bottom side of the top coupling flange 12 of the barrel 1. Thus, the screw member 3 can be moved axially forwardly with the cap 3 relative to the barrel 1 to compress the spring member 4. When released the pressure from the cap 3, the spring member 4 immediately pushes the cap 3 backwards to its former position where the coupling blocks 323 are stopped at the bottom side of the top coupling flange 12 of the barrel 1 to prohibit escape of the cap 3 from the barrel 1. When dismounting the screw member 2 and the cap 3 from the barrel 1, reverse the aforesaid procedure.

As stated above, the metal plate member fixation device installation method is to affix the barrel 1 to the first one of the two metal plate members 5 to be locked by a reflow soldering process, and then to assemble the screw member 2, the cap 3 and the spring member 4 together, and then to couple the cap 3 to the barrel 1, suspending the screw member 2 in the barrel 1 and holding the spring member 4 between the locating rib 221 of the screw member 2 and the step 101 of the barrel 1. This invention facilitates mounting and dismounting of the metal plate members 5. Further, because the barrel 1 is bonded to the first one of the two metal plate members 5 before coupling of the screw member 2, the cap 3 and the spring member 4 to the barrel 1, bonding of the barrel 1 to the first one of the two metal plate members 5 does not cause any structural strength damage to the screw member 2, cap 3 and spring member 4 of the metal plate member fixation device or change of physical properties of the screw member 2, cap 3 and spring member 4 of the metal plate member fixation device. Therefore, the invention assures high durability of the component parts of the metal plate member fixation device.

In conclusion, the invention provides a metal plate member fixation device installation method, which has the advantages and features as follows:

1. The barrel 1 is bonded to the first one of the two metal plate members 5 before coupling of the screw member 2, the cap 3 and the spring member 4 to the barrel 1, bonding of the barrel 1 to the first one of the two metal plate members 5 does not cause any structural strength damage to the screw member 2, cap 3 and spring member 4 of the metal plate member fixation device or change of physical properties of the screw member 2, cap 3 and spring member 4 of the metal plate member fixation device, and therefore the invention assures high durability of the metal plate member fixation device.
2. The bottom coupling flange 32 of the cap the cap 3 has longitudinal crevices 322 so that the bottom coupling flange 32 can be elastically expanded or compressed, facilitating mounting and dismounting operations. Therefore, the cap 3 can be coupled to the barrel 1 conveniently without any extra processing process.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:
1. A metal plate member fixation device installation method, comprising the steps of:
(a) preparing a barrel that comprises a top coupling flange, a bottom mounting unit having a radially extended bottom bonding flange and an axially extended bottom extension tube, a stepped axial hole and a step defined in said stepped axial hole, and then starting the installation operation;
(b) inserting the bottom extension tube of said bottom mounting unit of said barrel into a mounting through hole of a first one of two metal plate members to be affixed;

(c) abutting the bottom bonding flange of said bottom mounting unit of said barrel to a solder material on said first metal plate member around said mounting through hole and then applying a reflow soldering process to bond the bottom bonding flange of said barrel to said first metal plate member in a reflow oven;

(d) providing a screw member that comprises a head, a shank perpendicularly extended from the center of the bottom wall of said head, a thread spirally extending around the periphery of said shank, a shoulder connected between the bottom wall of said head and said shank and a cap that comprises a center opening axially extending through the top and bottom sides;

(e) coupling said screw member and said cap together;

(f) preparing a spring member and sleeving said spring member onto the shank of said screw member, and then inserting said screw member and said spring member into the stepped axial hole of said barrel at said first metal plate member;

(g) coupling said cap to said barrel to let said spring member be stopped between the step in the stepped axial hole of said barrel and a part of the shoulder of said screw member; and (h) releasing the pressure from said cap for enabling said spring member to push said screw member in direction away from said barrel to further have the lowest end of said cap be stopped at the top end of said barrel.

2. The metal plate member fixation device installation method as claimed in claim 1, wherein said cap comprises an annular retaining portion inwardly raised from the free end of said bottom coupling flange and axially slidably coupled to the periphery of said barrel between said top coupling flange and said bottom mounting unit.

3. The metal plate member fixation device installation method as claimed in claim 2, wherein said barrel comprises a plurality of notches cut through said top coupling flange; said bottom coupling flange of said cap comprises a plurality of coupling blocks that are respectively inserted through the notches of said barrel and coupled to said top coupling flange of said barrel after rotation of said cap relative to said barrel through an angle.

4. The metal plate member fixation device installation method as claimed in claim 1, wherein said screw member comprises a locating rib extending around the periphery of said shoulder for stopping against one end of said spring member.

5. The metal plate member fixation device installation method as claimed in claim 1, wherein said screw member comprises an engagement portion located on the periphery of the head thereof; said cap comprises an inside retaining groove forced into engagement with the engagement portion of said screw member tightly.

6. The metal plate member fixation device installation method as claimed in claim 1, wherein said screw member comprises an operating portion protruded from the head thereof and a tool groove defined in said operating portion for enabling said screw member to be rotated by a hand tool.

7. The metal plate member fixation device installation method as claimed in claim 1, wherein said cap comprises an embossed grip formed integral with the periphery thereof and a tapered bottom coupling flange surrounding said center opening and gradually reducing in diameter in direction away from said embossed grip.

8. The metal plate member fixation device installation method as claimed in claim 7, wherein said cap comprises a plurality of longitudinal crevices equiangularly spaced around said bottom coupling flange.

* * * * *